Dec. 25, 1945.   G. E. DATH   2,391,618
FRICTION SHOCK ABSORBER
Filed Oct. 22, 1943
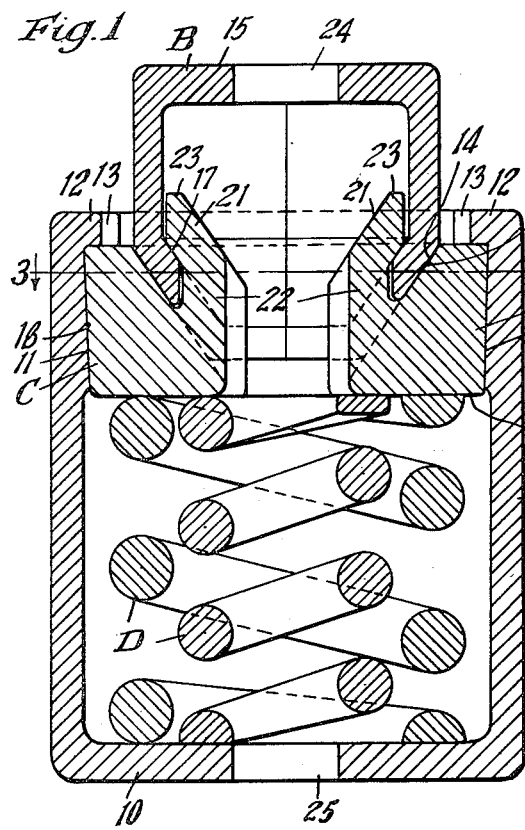
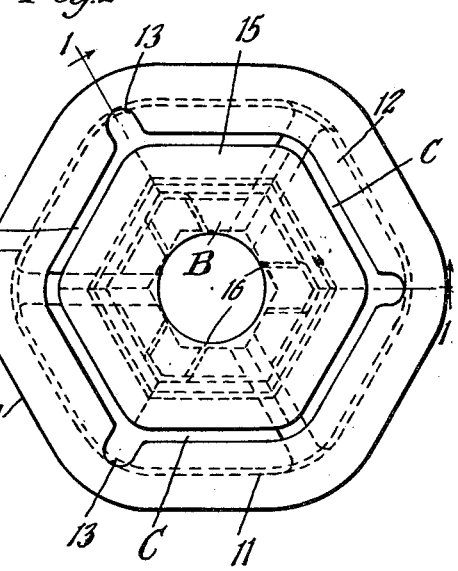
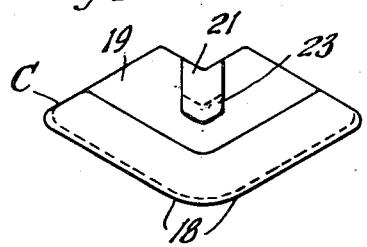
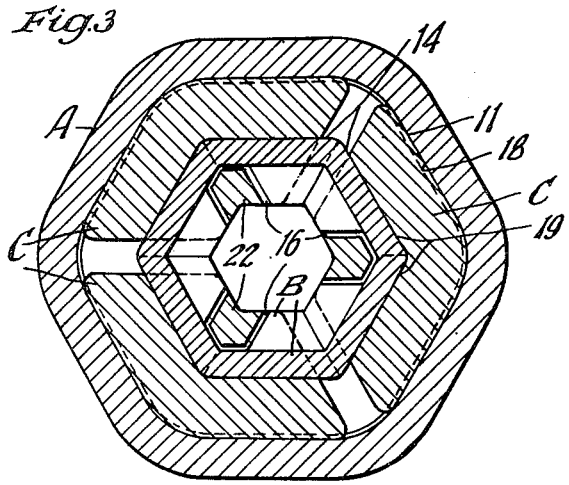
Inventor
George E. Dath
By Henry Fuchs
Atty.

Patented Dec. 25, 1945

2,391,618

UNITED STATES PATENT OFFICE 2,391,618

FRICTION SHOCK ABSORBER

George E. Dath, Chicago, Ill., assignor to W. H. Miner, Inc., Chicago, Ill., a corporation of Delaware Application October 22, 1943, Serial No. 507,229

6 Claims. (Cl. 267—9)

This invention relates to improvements in friction shock absorbers, especially adapted for use in connection with railway car truck springs for snubbing or dampening the action of the same.

One object of the invention is to provide a friction shock absorber, including a friction casing open at one end, and a spring resisted friction clutch comprising a wedge and friction shoes, telescoped within the open end of the casing, wherein the parts of the mechanism are held assembled by shouldered engagement between the wedge and shoes and between the casing and shoes.

A more specific object of the invention is to provide a mechanism as set forth in the preceding paragraph wherein the shoes are held against outward movement with respect to the casing by inturned flanges on the casing overhanging the shoes, and the wedge is anchored to the shoes by retaining lugs on the latter having hooked engagement with the wedge.

Other objects of the invention will more clearly appear from the description and claims hereinafter following.

In the drawing forming a part of this specification, Figure 1 is a vertical sectional view of my improved shock absorber on two intersecting vertical planes 120 degrees apart, said section corresponding substantially to the line 1—1 of Figure 2. Figure 2 is a top plan view of Figure 1. Figure 3 is a horizontal sectional view, corresponding substantially to the line 3—3 of Figure 1. Figure 4 is a top plan view of a friction shoe employed in my improved shock absorber.

My improved shock absorber comprises broadly a casing A; a wedge B; three friction shoes C—C—C; and a spring resistance D.

The specific friction shock absorber disclosed in the drawing is of the type usually employed as a snubber in connection with truck springs of railway cars, the same being preferably substituted for one of the spring units of a cluster of truck springs.

The casing A is of substantially hexagonal, interior and exterior cross section having the friction shell section at the upper end, which is open, and the spring cage section at the bottom end portion thereof. The casing A is closed at the bottom by a horizontal wall 10 formed integral with the side walls of said casing. The friction shell section of the casing is provided with six interior, flat friction surfaces 11 which converge inwardly of the casing and are spaced symmetrically about the central longitudinal axis of the mechanism. Three interior friction faces of V-shaped, transverse section are thus provided, each face comprising a set of two adjacent surfaces of the casing. At the open end, the casing A is provided with an inturned flange 12 which forms a stop for limiting outward movement of the shoes C. At alternate corners of the casing, the flange 12 is notched or recessed, as indicated at 13, for a purpose hereinafter described.

The wedge B is in the form of a hollow block having six, inwardly converging, flat wedge faces 14, arranged symmetrically about the central longitudinal axis of the mechanism, each set of two adjacent faces together forming a wedge face of V-shaped transverse section. At the upper end, the block B has a flat, transverse abutment face 15 adapted to receive the actuating force. The inner end portion of the block B is provided with three radial slots 16. The slots 16 are located at alternate meeting edges of the wedge faces 14 of the wedge B and extend entirely through the converging walls of the wedge which present the faces 14. The slots 16 terminate short of the upper ends of the converging walls of the wedge block thereby providing short inclined abutment faces or ledges 17 beyond the ends of the slots.

The friction shoes C, which are three in number, surround the wedge block B and are interposed between the wedge and the friction surfaces 11 of the casing A. Each shoe C has an outer friction surface 18 of V-shaped, transverse section engaging one of the V-shaped friction surfaces formed by two adjacent surfaces 11—11 of the casing, the apex of the engaged V-shaped surface of the casing being at one of the corners of the casing at which the flange 12 is notched. On the inner side, each shoe C has a wedge face 19 of V-shaped, transverse section engaging with and correspondingly inclined to one of the V-shaped wedge faces of the wedge B. At the inner end, each shoe has a flat, transverse face 20, forming an abutment for the spring resistance D. On the inner side of each shoe, at the lower end portion thereof, each shoe C has an upstanding hooklike lug 21 which is located at the intersection of the angularly diverging portions of the V-shaped wedge face 19 of the shoe. The lug 21 has a shank portion 22, which extends through the corresponding slot 16 of the wedge B, and an angularly extending hook portion 23 engaged over the abutment face 17 of the inclined wall portion of the wedge section proper of the block B.

The spring resistance D is interposed between the inner ends of the shoes C and the bottom wall of the casing and comprises a relatively light inner coil and a heavier outer coil, which are preferably under initial compression.

When assembled with the truck spring cluster of a railway car, my improved shock absorber is held centered by the usual projections of the top and bottom spring plates extending into openings 24 and 25 provided for this purpose in the top wall of the wedge B and the bottom wall 10 of the casing A.

In assembling the improved shock absorber, the spring resistance D and the three shoes are first placed within the casing, the shoes being supported on top of the spring. The shoes are then forced inwardly of the casing against the resistance of the spring to a predetermined extent, and at the same time displaced inwardly toward the central longitudinal axis of the mechanism. In other words, the unit formed by the three shoes is contracted as it is forced inwardly, so that the hook ends 23 of the lugs 21 will clear the inner ends of the ledges 17 of the wedge B and will pass freely through the slots 16 of said wedge. While the shoes are held in this position by suitable means, such as a three pronged tool having the prongs thereof surrounding the wedge and clearing the same and extended through the notches 13—13—13 of the flange 12 of the casing, the wedge is applied to the shoes by placing the same over the lugs 21, the latter being passed through the slots 16. The pressure is then removed from the shoes C, permitting the spring to force the same outwardly. While the shoes are forced outwardly by the spring, the wedge is blocked against outward movement so that the shoes will be spread apart to the extent shown in Figure 1, thereby forcing the lugs 21 into hooked engagement with the wedge B. As will be evident, outward movement of the shoes is limited by shouldered engagement thereof with the flange 12 of the casing and outward movement of the wedge B in turn is limited by hooked engagement of the shoes therewith.

The operation of my improved shock absorber is as follows: Upon compression of the mechanism between the spring follower plates of the truck spring cluster of the railway car, the wedge B is forced inwardly of the casing, spreading the shoes C—C—C apart and carrying them inwardly of the casing against the resistance of the spring resistance D, thereby producing high frictional resistance to provide snubbing action for the truck springs. Upon separation of the spring plates during recoil of the truck springs, the spring resistance D restores all of the parts to the normal position shown in Figure 1, outward movement of the shoes being limited by engagement with the flange 12 of the casing A and outward movement of the wedge B being limited by the hooklike lugs of the shoes.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction casing having interior friction surfaces; of a hollow central wedge pressure transmitting member having side walls provided with shoulders on the inner sides thereof; friction shoes interposed between the wedge and friction surfaces of the casing, said shoes having shouldered engagement with the casing to limit outward movement of the shoes; laterally, outwardly projecting lugs on the shoes engaging the shoulders of the wedge to limit outward movement of the wedge; and spring means opposing inward movement of the shoes.

2. In a friction shock absorbing mechanism, the combination with a friction casing open at one end and having interior friction surfaces at said open end; of an inturned stop flange at said open end of the casing; a hollow central wedge block having side walls provided with shoulders on the inner sides thereof; friction shoes surrounding said block and having wedging engagement therewith and sliding engagement with said friction surfaces, said shoes having their outward movement limited by engagement with the flange of the casing; outturned lugs on said shoes engaged with the shoulders of the wedge to limit outward movement of the wedge; and spring means within the casing opposing inward movement of the shoes.

3. In a friction shock absorbing mechanism, the combination with a friction casing; of a friction clutch slidable within the casing; a spring resistance opposing inward movement of the clutch, said clutch including a hollow wedge block and cooperating friction shoes, said shoes having shouldered engagement with the casing to limit outward movement of the shoes; and cooperating anchoring means on said shoes and wedge comprising laterally extending inclined ledges in said wedge and lugs on said shoes having outturned hooked ends engaged with said ledges.

4. In a friction shock absorbing mechanism, the combination with a friction casing having interior friction surfaces; of a central wedge pressure transmitting member having interior shoulders; friction shoes interposed between the wedge and friction surfaces of the casing, said shoes having shouldered engagement with the casing to limit outward movement of the shoes; upstanding lugs on said shoes having outturned hooked ends engaging the interior shoulders of the wedge to limit outward movement of the latter; and spring means yieldingly opposing inward movement of the shoes.

5. In a friction shock absorbing mechanism, the combination with a friction casing open at one end and having interior friction surfaces at said open end; of an inturned stop flange at the open end of said casing; a central hollow wedge block having laterally, inwardly converging rear walls presenting wedge surfaces on the outer sides thereof; friction shoes surrounding the block and having wedge faces engaging the wedge faces of the block, said shoes having sliding engagement with the friction surfaces of the casing, said shoes having their outward movement limited by engagement with the flange of the casing; upstanding lugs on said shoes having outwardly turned, inclined, hooked ends engaged with the inner surfaces of the converging walls of the wedge block to limit outward movement of said block; and spring means yieldingly opposing inward movement of the shoes.

6. In a friction shock absorbing mechanism, the combination with a friction casing open at one end and having interior friction surfaces at said open end; of an inturned stop flange at the open end of said casing; a central hollow wedge block having laterally, inwardly converging rear walls presenting wedge surfaces on the outer sides thereof, said converging rear walls having radially extending, slotlike openings therethrough terminating inwardly of the outer ends of said walls; friction shoes surrounding said wedge block and having wedge faces engaging the wedge faces of said block, said shoes having sliding engagement with the friction surfaces of the casing, said shoes having their outward movement limited by engagement with the flange of the casing; lugs on said shoes upstanding from the wedge faces thereof and extending through the slots of the wedge block, said lugs having outturned inclined end portions overhanging the inner sides of the converging rear wall portions of the wedge block beyond the outer ends of said slots to engage said wall portions and limit outward movement of the wedge block; and spring means yieldingly opposing inward movement of the shoes.

GEORGE E. DATH.